US007006913B2

(12) United States Patent
Sgatti et al.

(10) Patent No.: US 7,006,913 B2
(45) Date of Patent: Feb. 28, 2006

(54) METHOD FOR FINDING THE ANGULAR ACCELERATION OF A DRIVE SHAFT OF AN INTERNAL COMBUSTION ENGINE BY MEANS OF A GEAR WHEEL INTEGRAL WITH SAID DRIVE SHAFT

(75) Inventors: Stefano Sgatti, Imola (IT); Luigi De Luca, Bologna (IT); Massimo Zanotti, Vado (IT)

(73) Assignee: Magneti Marelli Powertrain S.p.A., Corbetta (IT)

( * ) Notice: Subject to any disclaimer, the term of this patent is extended or adjusted under 35 U.S.C. 154(b) by 0 days.

(21) Appl. No.: 10/940,586

(22) Filed: Sep. 14, 2004

(65) Prior Publication Data

US 2005/0096834 A1 May 5, 2005

(30) Foreign Application Priority Data

Sep. 15, 2003 (IT) .......................... BO2003A0529

(51) Int. Cl.
*G01M 15/00* (2006.01)
(52) U.S. Cl. ......................................... 701/111; 73/116
(58) Field of Classification Search ................ 701/111, 701/29, 110, 34; 73/116, 117.3
See application file for complete search history.

(56) References Cited

U.S. PATENT DOCUMENTS

| 4,527,531 A | * | 7/1985 | Koyanagi et al. ......... 73/119 A |
| 5,231,966 A | * | 8/1993 | Yoshida et al. ............. 123/436 |
| 5,428,991 A | | 7/1995 | Klenk et al. |
| 5,528,929 A | | 6/1996 | Ikebuchi |
| 6,062,071 A | * | 5/2000 | Henn et al. ................. 73/117.3 |

FOREIGN PATENT DOCUMENTS

| DE | 195 44 720 | 3/1997 |
| DE | 196 22 042 | 12/1997 |
| DE | 198 04 327 | 8/1999 |
| EP | 0 849 581 | 6/1998 |

OTHER PUBLICATIONS

English Translation of Abstract of DE 196 22 042 dated Dec. 4, 1997.
English Translation of Abstract of DE 195 44 720 dated Mar. 13, 1997.
English Translation of Abstract of DE 198 04 327 dated Aug. 5, 1999.

* cited by examiner

*Primary Examiner*—Hieu T. Vo
(74) *Attorney, Agent, or Firm*—Ladas and Parry LLP

(57) ABSTRACT

Method for finding the angular acceleration of a drive shaft of an internal combustion engine by means of a gear wheel integral with said drive shaft; the method making provision to identify, in each complete revolution of the drive shaft, a number of angular measurement lines, to measure the time used by the drive shaft to pass over each angular measurement line using the signal supplied by the gear wheel, to add algebraically, to the time used by the drive shaft to pass over each angular measurement line, a corresponding correction coefficient that takes account of any asymmetries in the gear wheel, and to determine the value of angular acceleration of the drive shaft as a function of the time used by the drive shaft to pass over each angular measurement line; the value of the correction coefficients is determined in the course of an engine fuel cut-off phase.

8 Claims, 4 Drawing Sheets

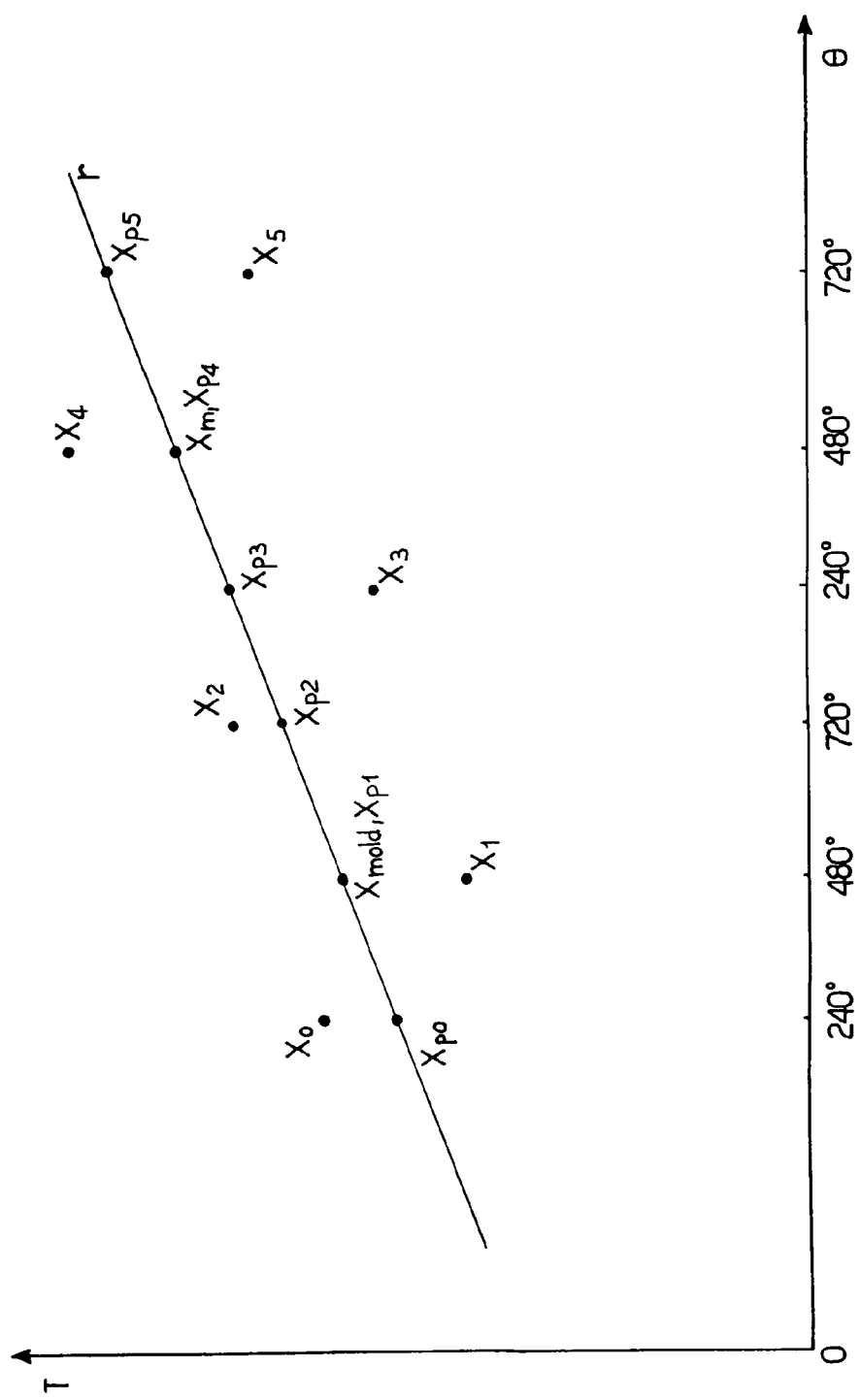

METHOD FOR FINDING THE ANGULAR ACCELERATION OF A DRIVE SHAFT OF AN INTERNAL COMBUSTION ENGINE BY MEANS OF A GEAR WHEEL INTEGRAL WITH SAID DRIVE SHAFT

The present invention relates to a method for finding the angular acceleration of a drive shaft of an internal combustion engine by means of a gear wheel integral with said drive shaft.

BACKGROUND OF THE INVENTION

In an internal combustion engine with ignition control, the term "misfire phenomenon" or misfire indicates a phenomenon of poor combustion occurring within one or more cylinders; in particular, misfire is referred to as ignition misfire when it is caused by insufficient or no energy from the spark generated by the spark plug, or referred to as injection misfire when it is caused by insufficient or no fuel supply.

The existence of the misfire phenomenon proves particularly detrimental, since poor combustion involves a decline in engine performance, an increased level of polluting emissions from the engine and possible permanent damage to the catalyser. Therefore, European regulations (in particular European Directive 70/220 and successive amendments thereto) on emission limits for motor vehicles makes provision both for an effective recognition of the misfire phenomenon, and that the driver be alerted to the existence of the misfire phenomenon by means of a flashing light placed on the dashboard. More specifically, European regulations on emission limits for motor vehicles provides that an increased level of polluting emissions be notified when the number of misfires in a first time interval (for example 1000 TDC—top dead centres) exceeds a first threshold, and that permanent damage to the catalyser be notified when the number of misfires in a second time interval (for example 200 TDC—top dead centres) exceeds a second threshold.

Currently, recognition of the misfire phenomenon is carried out indirectly, that is, by analysing the instantaneous value of the angular acceleration of the drive shaft or the instantaneous value of the engine torque, since direct analysis of combustion by means of sensors placed inside every cylinder proves impracticable for reasons of cost.

The most widespread method of recognising the misfire phenomenon consists in analysing the angular acceleration of the drive shaft; in particular, for example described in patent application EP-0637738-A1, use is made of the signal supplied by a gear wheel integral with the drive shaft, also called a phonic wheel, in order to calculate the value of the angular acceleration of the drive shaft in relation to given angular positions of said drive shaft, and the misfire phenomenon is recognised if the absolute value of angular acceleration of the drive shaft is greater than a given threshold value. It is clear that any structural (ellipticity) or assembly (eccentricity) irregularities of the gear wheel must be compensated in order to prevent them from being confused with variations in speed of said gear wheel, with consequent errors in the application of control strategies. The rotational speed of the gear wheel is analysed by taking account of an angular window containing a single point of generation of engine torque, that is a single TDC; since the distribution of TDCs over the entire revolution of the gear wheel is a function of the number of the cylinders and since every tooth of the gear wheel must be compensated, it is clear that the method of compensating for the irregularities of the gear wheel must take account of the number of cylinders in the system.

Some methods have been proposed for finding the angular acceleration of the drive shaft by means of the gear wheel, which methods provide compensation for any irregularities in said gear wheel; compensation of any irregularities in the gear wheel is carried out by determining a vector of correction coefficients, each of which is algebraically added to the results of respective measurements made by reading the gear wheel. The values of the correction coefficients are determined in the course of a fuel cut-off phase, because in this way the effects of combustion are absent and no further torque is generated to disturb the measurement of the speed of the gear wheel.

However, each of the methods proposed for compensating any irregularities of the gear wheel is designed for a respective number of cylinders and therefore proves not to be applicable to an engine with a previously unknown number of cylinders. Therefore, it is necessary to produce, for each number of cylinders, a respective electronic exchange capable of recognising the misfire phenomenon, with a consequent increase in costs associated with the lack of standardisation, or else it is necessary to implement in any one electronic exchange several methods for compensating any irregularities in the gear wheel to be used as an alternative as a function of the number of cylinders of the engine, with a consequent increase in costs associated with the greater use of memory of the electronic exchange.

SUMMARY OF THE INVENTION

The purpose of the present invention is to provide a method for finding the angular acceleration of a drive shaft of an internal combustion engine by means of a gear wheel integral with said drive shaft, which method has none of the disadvantages described above and, in particular, is able to operate with an engine having a previously unknown number of cylinders.

According to the present invention a method is provided for finding the angular acceleration of a drive shaft of an internal combustion engine by means of a gear wheel integral with said drive shaft; the method making provision:

to identify, in each complete revolution of the drive shaft, a number of angular measurement lines having the same amplitude, to measure the time used by the drive shaft to pass over each angular measurement line using the signal supplied by the gear wheel, to add algebraically, to the time used by the drive shaft to pass over each angular measurement line, a corresponding correction coefficient that takes account of any asymmetries in the gear wheel in the relative angular measurement line, and to determine the value of angular acceleration of the drive shaft as a function of the time used by the drive shaft ito pass over each angular measurement line; the value of the correction coefficients i being determined in the course of an engine fuel cut-off phase;

the method being characterised in that:

in the course of a fuel cut-off phase a succession of times used by the drive shaft to pass over the angular measurement lines is recorded during half a combustion phase if the number of cylinders is even and during a whole combustion phase if the number of cylinders is odd;

by means of the succession of times used by the drive shaft to pass over the angular measurement lines, a straight line is determined that interpolates the ideal course of the evolution of the times used by the drive shaft to pass over the angular measurement lines in a plane angle of the drive shaft/time; and for the i-th angular measurement line, the absolute value of the correction coefficient is equal to the difference between the measured value of time used by the drive shaft to pass over the i-th angular measurement line and the corresponding value of time used by the drive shaft to pass over the i-th angular measurement line obtained on the straight line as a projection at a constant angle of the measured value.

BRIEF DESCRIPTION OF THE DRAWINGS

The present invention will now be described with reference to the attached drawings, which illustrate a non-exhaustive embodiment thereof, in which:

FIG. 4 is a diagram that shows in the plane angle θ/time T some values used by a control exchange for an engine supplied with three cylinders during its operation.

DETAILED DESCRIPTION OF THE INVENTION

Figure 1:
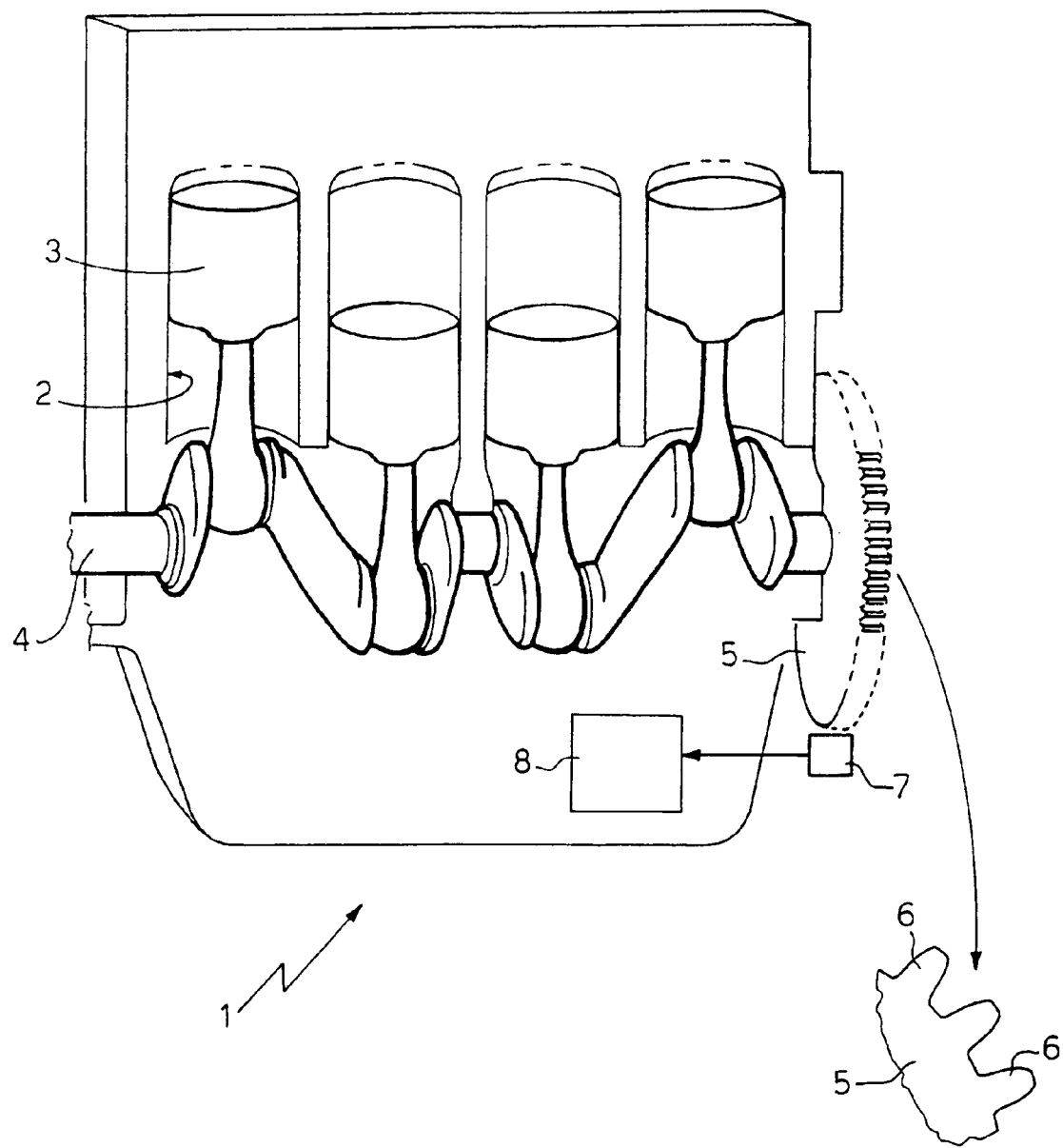
FIG. 1 is a diagrammatic view, in side elevation and in section, of an internal combustion engine provided with a control exchange, which implements the method for recognising the misfire phenomenon that is the subject-matter of the present invention.

In FIG. 1, the reference number 1 indicates, as a whole, an internal combustion engine supplied with petrol and comprising four cylinders 2, each of which accommodates a respective piston 3 mechanically connected to a drive shaft 4 in order to transmit to said drive shaft 4 the force generated by the combustion of the petrol inside the respective cylinder 2. To the drive shaft 4 is fastened a gear wheel 5 (called also a phonic wheel) provided with 60 teeth 6 and coupled to a magnetic sensor 7, which is capable of finding the elapsed time between the passage of two consecutive teeth 6. The engine 1 also comprises a control exchange 8, which is connected to the sensor 7 and is capable of recognising misfire phenomena that occur inside the cylinders 2 using the information supplied by the sensor 7 coupled to the gear wheel 5.

For each complete revolution of the drive shaft 4 (and therefore of the gear wheel 5) as many values acc of the angular acceleration of the drive shaft 4 are estimated as there are cylinders 2 that perform combustion during a complete revolution of the drive shaft 4 and an analysis of the values acc of the angular acceleration of the drive shaft 4 indicates the existence of any misfire phenomena; with reference to the engine 1 illustrated in FIG. 1, two values acc of the angular acceleration of the drive shaft 4 are therefore estimated for each complete revolution of the drive shaft 4.

In each complete revolution of the drive shaft 4 two (equal to the number of cylinders 2 that perform combustion during a complete revolution of the drive shaft 4) angular measurement lines having the same amplitude are identified, the time used by the drive shaft 4 to pass over each angular measurement line is measured and the value acc of the angular acceleration of the drive shaft 4 at the i-th moment is determined by applying the following formula:

$$acc_i = \frac{T_{i+1} - T_i}{T_i^3}$$

in which:

$acc_i$ is the angular acceleration of the drive shaft 4 at the i-th moment;

$T_{i+1}$ is the time used by the drive shaft 4 to pass over the (i+1)-th angular measurement line;

$T_i$ is the time used by the drive shaft 4 to pass over the i-th angular measurement line.

The time used by the drive shaft 4 to pass over each angular measurement line is measured by using the signal supplied by the gear wheel 5; for information, each angular measurement line has an angular amplitude equal to a number of teeth 6 of the gear wheel 5 between 3 and 12. Preferably, each angular measurement line coincides substantially with the expansion course of a respective piston 3 or is at least partly superimposed on the expansion course of a respective piston 3.

Figure 2:
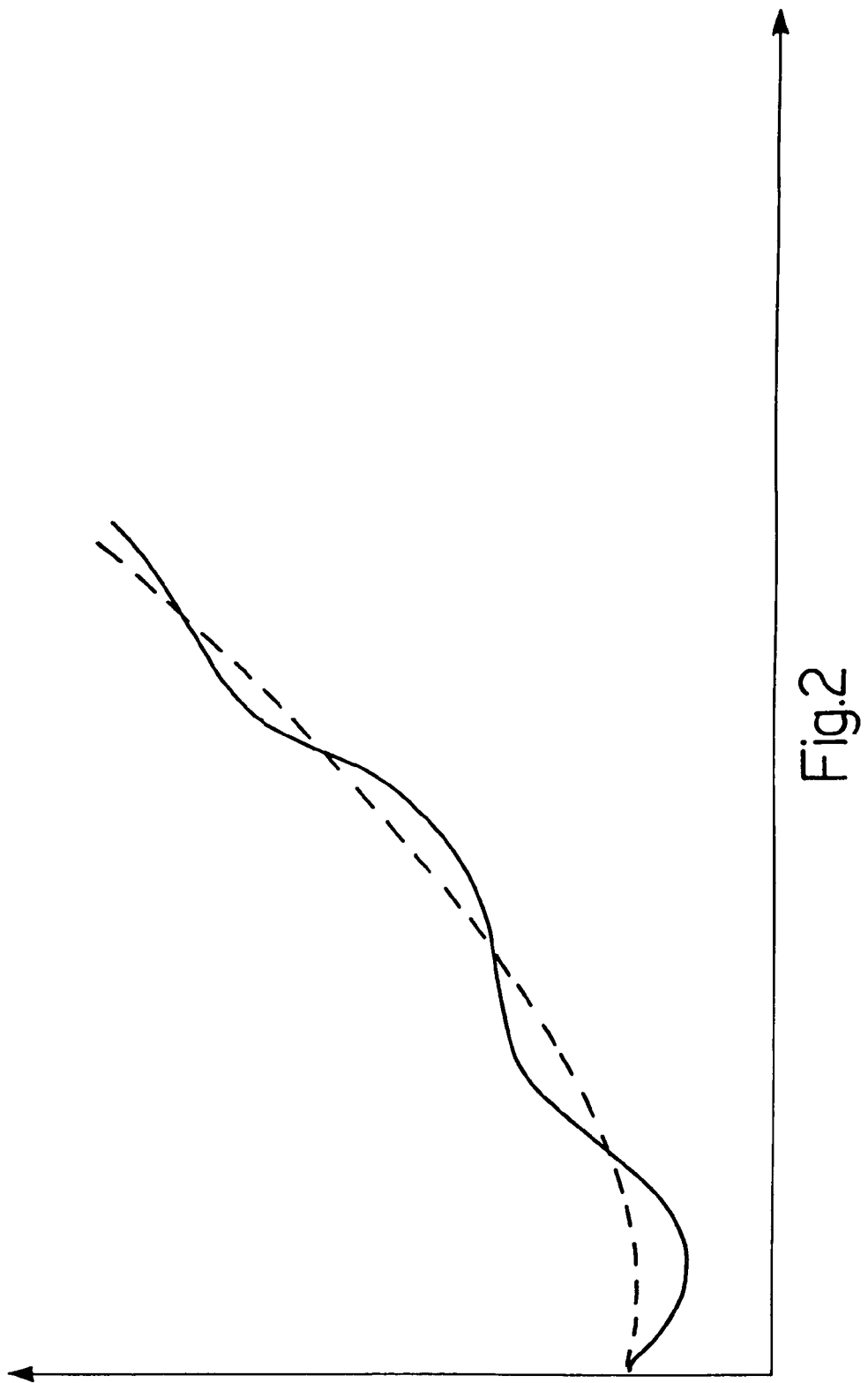
FIG. 2 is a diagram that indicates, as a function of the angular position of the gear wheel, the value of time used by each one to pass over a reading sensor in the course of a fuel cut-off phase; the diagram illustrates, with a solid line, a real situation where there are irregularities of the gear wheel and, with a broken line, an ideal situation where there are no irregularities of the gear wheel.

The gear wheel 5 can be affected by asymmetry problems (the most common defects are ellipticity and eccentricity), which produce random variations in the duration of the teeth, i.e. in the time used by each tooth 6 to travel corresponding to the sensor 1. FIG. 2 illustrate a diagram that indicates, as a function of the angular position of the gear wheel 5, the value for the duration of the teeth in the course of one fuel cut-off phase; in the diagram a solid line indicates a real situation where there are irregularities in the gear wheel 5 and a broken line indicates an ideal situation where there are no irregularities in the gear wheel 5. A random variation in the duration of the teeth is reflected in the measurement of the time $T_i$ used by the drive shaft 4 to pass over every angular measurement line and is consequently reflected in the estimated value acc for the angular acceleration of the drive shaft 4; uncompensated asymmetry problems of the gear wheel 5 can, therefore, have the effect of distorting the recording of misfire phenomena.

In order to compensate any asymmetries of the gear wheel 5, to each time $T_i$ used by the drive shaft 4 to pass over the i-th angular measurement line is algebraically added a corresponding correction coefficient $K_i$ that takes account of any asymmetries of the wheel 5 corresponding to the i-th angular measurement line.

The values of the correction coefficients $K_i$ are determined by the control exchange 8 in the course of a fuel cut-off phase, because in this way there are no effects of combustion and no further torque is generated to disturb the measurement. The number of the cylinders (equal to four in the case of the engine 1 illustrated in FIG. 1) being called ncyl, the value of a coefficient M equal to the number ncyl of the cylinders is determined if this number ncyl of the cylinders is odd and equal to half the number ncyl of the cylinders if this number ncyl of the cylinders is even:

| | |
|---|---|
| M = ncyl/2 | if ncyl is even |
| M = ncyl | if ncyl is odd |

Figure 3:
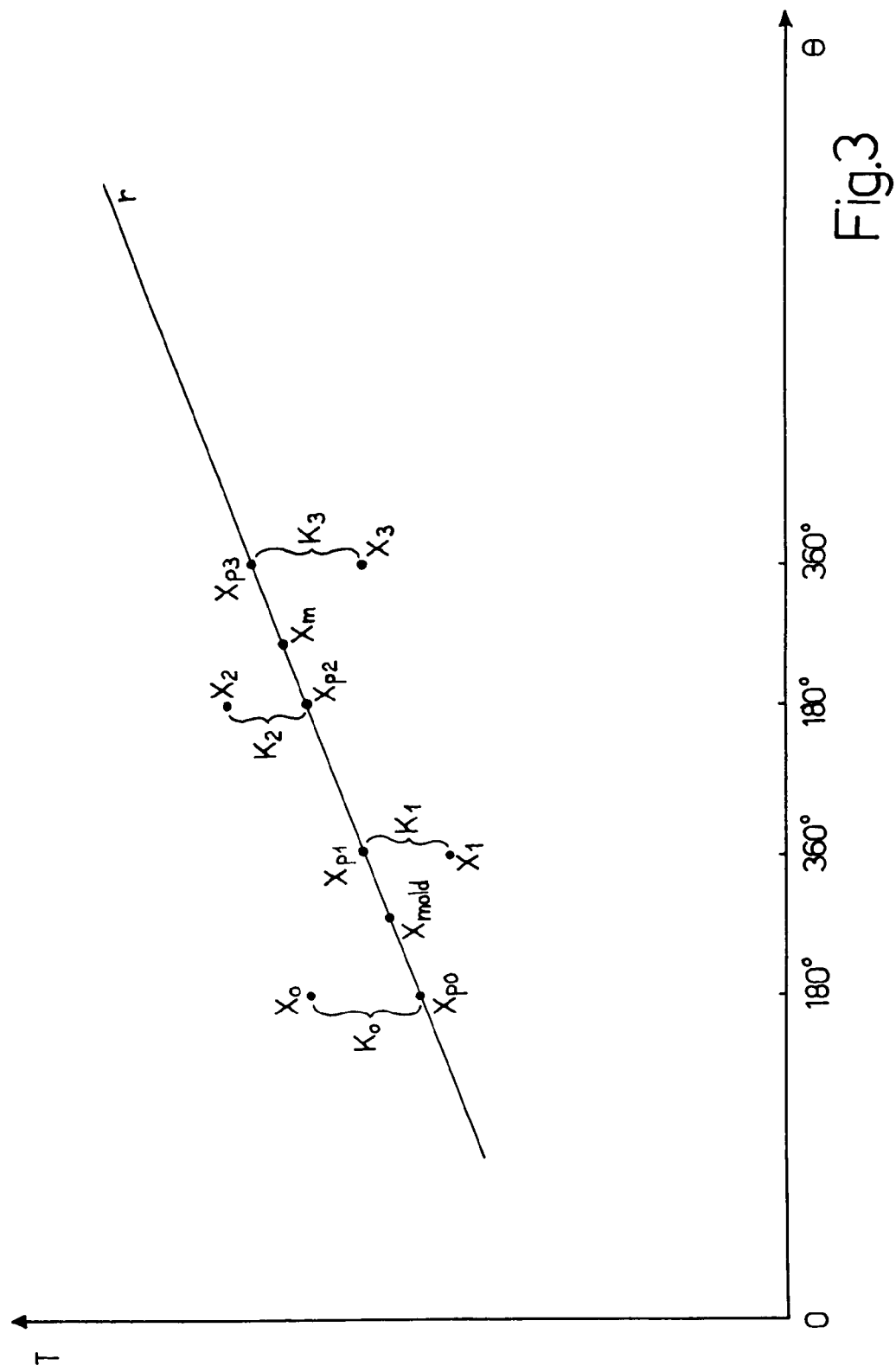
FIG. 3 is a diagram that shows, in the plane angle θ/time T some values used by a control exchange for the engine in FIG. 1 provided with four cylinders during its operation.

In the course of a fuel cut-off phase a succession of times $T_i$ used by the drive shaft 4 to pass over the angular measurement lines is recorded during half a combustion phase (360°, equal to a complete revolution of the gear wheel 5) if the number ncyl of cylinders is even and during a complete combustion phase (720°, two complete revolutions of the gear wheel 5) if the number ncyl of the cylinders is odd; each time $T_i$ is associated with a corresponding angle $\theta_i$ of the drive shaft at a predefined point (typically the intermediate point) of the i-th angular measurement line. Each pair of values $\theta_i$, $T_i$ corresponds to a respective point $x_i$ in the plane angle $\theta_i$/time T as illustrated in FIG. 3; it should be observed that the angles $\theta_i$ of the points $x_i$ are multiples of the same angular value (equal to 360°/M, i.e. 180° in the case of the engine 1 having 4 cylinders).

It is assumed that in the fuel cut-off phase the angular speed of revolution of the drive shaft 4 diminishes linearly, at least within a time interval composed of a few complete revolutions of the drive shaft 4; in accordance with such assumption, a straight line r is determined that interpolates the ideal course of the evolution of the times $T_i$ used by the drive shaft 4 to pass over the angular measurement lines and, in order to define such a straight line r, two points $x_{mold}$ and $x_m$ are determined on this straight line by means of the following equations (the points $x_{mold}$ and $x_m$ correspond respectively to the present combustion and the previous combustion):

$$x_m, x_{mold}(\theta, T) = \frac{\sum_{i=1}^{M} x_i}{M}$$

$$\theta_x = \frac{\sum_{i=1}^{M} \theta_i}{M}$$

$$T_x = \frac{\sum_{i=1}^{M} T_i}{M}$$

in which $\theta_x$ is the value of the angle of the point $x_m$, $x_{mold}$ and $T_x$ is the value of time for the point $x_m$, $x_{mold}$.

A gradient S of the straight line r is calculated by the following equation:

$$S = \frac{T_{xm} - T_{xmold}}{M}$$

in which $T_{xm}$ is the value of time for the point $x_m$ and $T_{xmold}$ is the value of time for the point $x_{mold}$.

The projection at a constant angle $x_{pi}(\theta_{pi}, T_{pi})$ of a point $x_i(\theta i, T_i)$ on the straight line r is determined by the following equations:

$$\begin{cases} T_{p1} = T_{xmold} + S \cdot \frac{M-1}{2} \\ T_{p(i+1)} = T_{pi} + S \end{cases}$$

in which $T_{xmold}$ is the value of time for the point $x_{mold}$; it should be noted that $\theta_{pi}$ coincides with $\theta_i$ since the projection $x_{pi}$ of $x_i$ on the straight line r is performed at a constant angle.

For the i-th angular measurement line, the absolute value of the correction coefficient $K_i$ is equal to:

$$K_i = T_{pi} - T_i$$

in which $T_i$ is the value of time for the point $x_i$, while $Tp_i$ is the value of time for the point $x_{pi}$ obtained as described above by projecting the point x on the straight line r.

The standard value of the correction coefficient $K_{iNOR}$ is equal to:

$$K_{iNOR} = \frac{T_{pi} - T_i}{T_i}$$

In other words, in the course of a fuel cut-off phase a succession of times $T_i$ used by the drive shaft 4 to pass over the angular measurement lines is recorded during half a combustion phase if the number ncyl of cylinders 2 is even and during an entire combustion phase if the number ncyl of cylinders 2 is odd; by means of the succession of times $T_i$ used by the drive shaft 4 to pass over the angular measurement lines, a straight line r is determined that interpolates the ideal course of the evolution of the times $T_i$ used by the drive shaft 4 to pass over the angular measurement lines in a plane angle θ of drive shaft 4/time T. Finally, for the i-th angular measurement line, the absolute value of the correction coefficient $K_i$ is equal to the difference between the measured value of time T used by the drive shaft 4 to pass over the i-th angular measurement line and the corresponding value of time $T_{pi}$ used by the drive shaft 4 to pass over the i-th angular measurement line obtained on the straight line r as a projection at a constant angle of the measured value.

Normally, the whole range of operating values of the rotational speed of the drive shaft 4 (for example 1500 rpm–6000 rpm in the case of the engine 1 in FIG. 1) is subdivided into bands of rotational speed and, for each band the standard values of the correction coefficients $K_{iNOR}$ are determined using the methods described above. Clearly, increasing the number of bands of rotational speed improves the quality of the correction coefficients $K_{iNOR}$, but at the same time increases the amount of memory used in the control exchange 8. During the life of the engine 1, for each band of rotational speed the standard values of the correction coefficients $K_{iNOR}$ are calculated several times and the values actually used for compensating asymmetries of the gear wheel 5 are the result of a weighted average of the calculated values.

FIG. 4 illustrates a diagram in the plane angle θ/time T analogous to the diagram in FIG. 3, the only difference being that the diagram in FIG. 3 refers to the engine 1 in FIG. 1 having four cylinders 2, while the diagram in FIG. 4 refers to an engine (not illustrated) having three cylinders.

It should be observed that the calculation method described above in order to determine the standard values of the correction coefficient $K_{iNOR}$ is valid for any number and configuration of cylinders; however, for geometric reasons there are minimal differences between the case of an even number ncyl of cylinders and an odd number ncyl of cylinders, which differences involve the differing value of some variables.

The calculation method described above for determining the standard values of the correction coefficients $K_{iNOR}$ works independently of the number and configuration of the cylinders and it involves benefits in the form of simplicity of use and reliability (a single solution for all engines) and speed (no configuration is required), particularly where "rapid prototyping" models and systems are used. Moreover, various experimental tests have shown that the calculation method described above makes it possible to determine extremely precisely and reliably the standard values of the correction coefficients $K_{iNOR}$.

The invention claimed is:

1. Method for finding the angular acceleration of a drive shaft (4) of an internal combustion engine (1) using a gear wheel (5) integral with said drive shaft (4); the method comprising the steps of:

identifying, in each complete revolution of the drive shaft (4), a number of angular measurement lines having the same amplitude, determining, in the course of an engine fuel cut-off phase (1), values of correction coefficients ($K_i$) that take account of asymmetries in the gear wheel (5) relative to the angular measurement lines, measuring the time ($T_i$) used by the drive shaft (4) to pass over each angular measurement line using the signal supplied by the gear wheel (5), adding algebraically, to the time used by the drive shaft (4) to pass over each angular measurement line, a corresponding correction coefficient ($K_i$), and determining the value (acc) of angular acceleration of the drive shaft (4) as a function of the time ($T_i$) used by the drive shaft (4) to pass over each angular measurement line;

wherein the determining of the values of the correction coefficients ($K_i$) comprise the further steps of:

recording in the course of a fuel cut-off phase a succession of times ($T_i$) used by the drive shaft (4) to pass over the angular measurement lines is during half a combustion phase if the number (ncyl) of cylinders (2) is even and during a whole combustion phase if the number (ncyl) of cylinders (2) is odd;

determining, using the succession of times ($T_i$) used by the drive shaft (4) to pass over the angular measurement lines, a straight line (r) that interpolates the ideal course of the evolution of the times ($T_i$) used by the drive shaft (4) to pass over the angular measurement lines in a plane angle ($\theta$) of the drive shaft (4)/time (T); and determining, for the i-th angular measurement line, the absolute value of the correction coefficient ($K_i$) as the difference between the measured value of time ($T_i$) used by the drive shaft (4) to pass over the i-th angular measurement line and the corresponding value of time ($T_{pi}$) used by the drive shaft (4) to pass over the i-th angular measurement line obtained on a straight line (r) as a projection at a constant angle of the measured value.

2. Method according to claim 1, wherein the straight line (r) that interpolates the ideal course of the evolution of the times ($T_i$) used by the drive shaft (4) to pass over the angular measurement lines in a plane angle ($\theta$) of the drive shaft (4)/time (T) is obtained by determining a first point ($x_{mold}$) of reference of the straight line (r) corresponding to the previous combustion and a second point ($x_m$) of reference of the straight line (r) corresponding to the present combustion by the following formula:

$$x_m, x_{mold}(\theta, T) = \frac{\sum_{i=1}^{M} x_i}{M}$$

$$\theta_x = \frac{\sum_{i=1}^{M} \theta_i}{M}$$

$$T_x = \frac{\sum_{i=1}^{M} T_i}{M}$$

in which:

$x_{mold}(\theta, T)$ is the first point of reference of the straight line (r);

$x_m(\theta, T)$ is the second point of reference of the straight line (r);

$x_i$ is a succession of measurement points corresponding to the succession of times ($T_i$) used by the drive shaft (4) to pass over the angular measurement lines, each point $x_i$ being defined by the time ($T_i$) used by the drive shaft (4) to pass over respective angular line and by the angle ($\theta_i$) of the drive shaft (4) at a predefined point of said angular measurement line;

$\theta_x$ is the value of the angle of point $x_m$, $x_{mold}$;

$T_x$ is the value of time for the point $x_m$, $x_{mold}$; and

M is a coefficient equal to the number (ncyl) of cylinders (2) if this number (ncyl) of cylinders (2) is odd and equal to half the number (ncyl) of cylinders (2) if this number (ncyl) of cylinders (2) is even.

3. Method according to claim 2, wherein a gradient (S) of the straight line (r) is calculated using the following formula:

$$S = \frac{T_{xm} - T_{xmold}}{M}$$

in which:

S is the gradient of the straight line (r);

$T_{xm}$ is the value of time for the second reference point ($x_m$);

$T_{xmold}$ is the value of time for the first reference point ($x_{mold}$); and M is a coefficient equal to the number (ncyl) of cylinders (2) if this number (ncyl) of cylinders (2) is odd and equal to half the number (ncyl) of cylinders (2) if this number (ncyl) of cylinders (2) is even;

the projection at a constant angle ($x_{pi}$) of a measurement point ($x_i$) on the straight line (r) is determined by the following equations:

$$\begin{cases} T_{p1} = T_{xmold} + S \cdot \frac{M-1}{2} \\ T_{p(i+1)} = T_{pi} + S \end{cases}$$

in which:

$T_{pi}$ is the value of time (T) of the projection at a constant angle ($x_{pi}$) of the i-th measurement point ($x_i$) on the straight line (r);

S is the gradient of the straight line (r);

$T_{xm}$ is the value of time for the second reference point ($x_m$);

$T_{xmold}$ it is the value of time for the first reference point ($x_{mold}$); and M is a coefficient equal to the number (ncyl) of cylinders (2) if this number (ncyl) of cylinders (2) is odd and equal to half the number (ncyl) of cylinders (2) if this number (ncyl) of cylinders (2) is even;

for the i-th angular measurement line, the absolute value of the correction coefficient ($K_i$) is equal to:

$$K_i = T_{pi} - T_i$$

and the standard value of the correction coefficient ($K_{iNOR}$) is equal to:

$$K_{iNOR} = \frac{T_{pi} - T_i}{T_i}$$

in which:

$K_i$ is the absolute value of the correction coefficient $K_i$ for the i-th angular measurement line;

$K_{iNOR}$ s the standard value of the correction coefficient for the i-th angular measurement line;

$T_i$ is the value of time for the i-th measurement point $x_i$; and $T_{pi}$ is the value of time (t) of the projection at a constant angle ($x_{pi}$) of the i-th measurement point ($x_i$) on the straight line (r).

4. Method according to claim 1, wherein the entire range of operating values of the rotational speed of the drive shaft (4) is subdivided into bands of rotational speed and for each band the values of the correction coefficients ($K_i$) are determined.

5. Method according to claim 4, wherein during the life of the engine (1), for each band of rotational speed the values of the correction coefficients ($K_i$) are calculated several times and the values actually used for compensating the asymmetries of the gear wheel (5) are the result of a weighted average of the values calculated.

6. Method according to claim 1, wherein the number of angular measurement lines is equal to the number of cylinders (2) that perform combustion during a complete revolution of the drive shaft (4).

7. Method according to claim 1, wherein each angular measurement line has an angular amplitude equal to a number of teeth (6) of the gear wheel (5) between 3 and 12.

8. Method according to claim 1, wherein the value (acc) of the angular acceleration of the drive shaft (4) at the i-th moment is determined by applying the following formula:

$$acc_i = \frac{T_{i+1} - T_i}{T_i^3}$$

in which:

$acc_i$ is the angular acceleration of the drive shaft (4) at the i-th moment;

$T_{i+1}$ is the time used by the drive shaft (4) to pass over the (i+1)-th angular measurement line;

$t_i$ is the time used by the drive shaft (4) to pass over the i-th angular measurement line.

* * * * *